E. H. OLETZKY.
CHAFF SEPARATING MACHINE.
APPLICATION FILED FEB. 2, 1916.
1,199,599.
Patented Sept. 26, 1916.
3 SHEETS—SHEET 3.
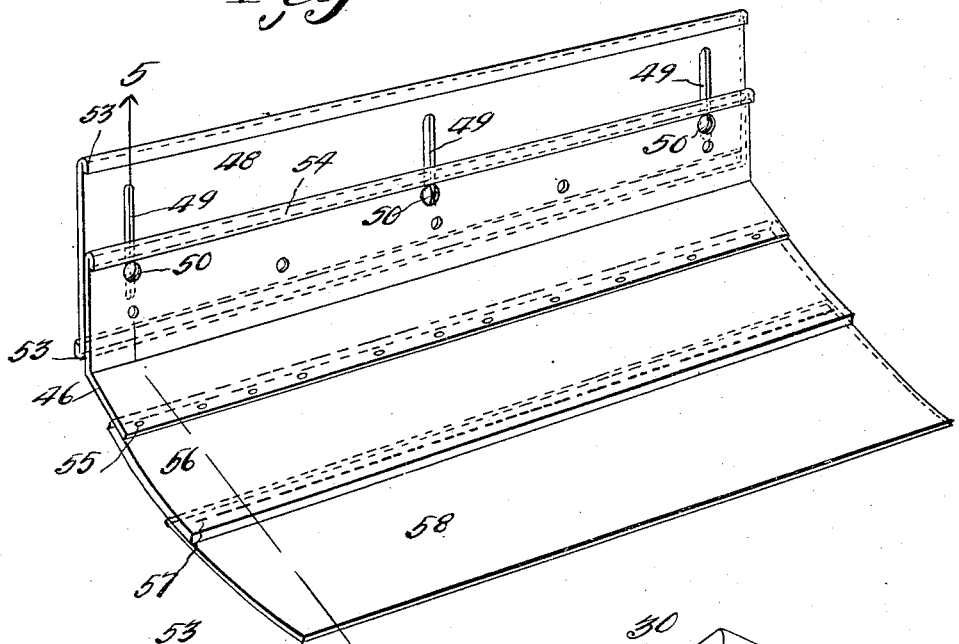
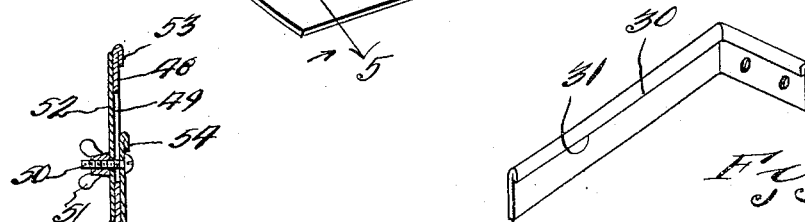
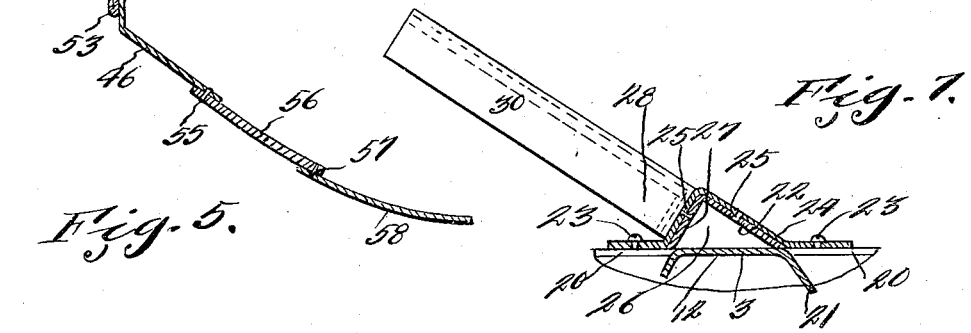
Inventor
E. H. Oletzky

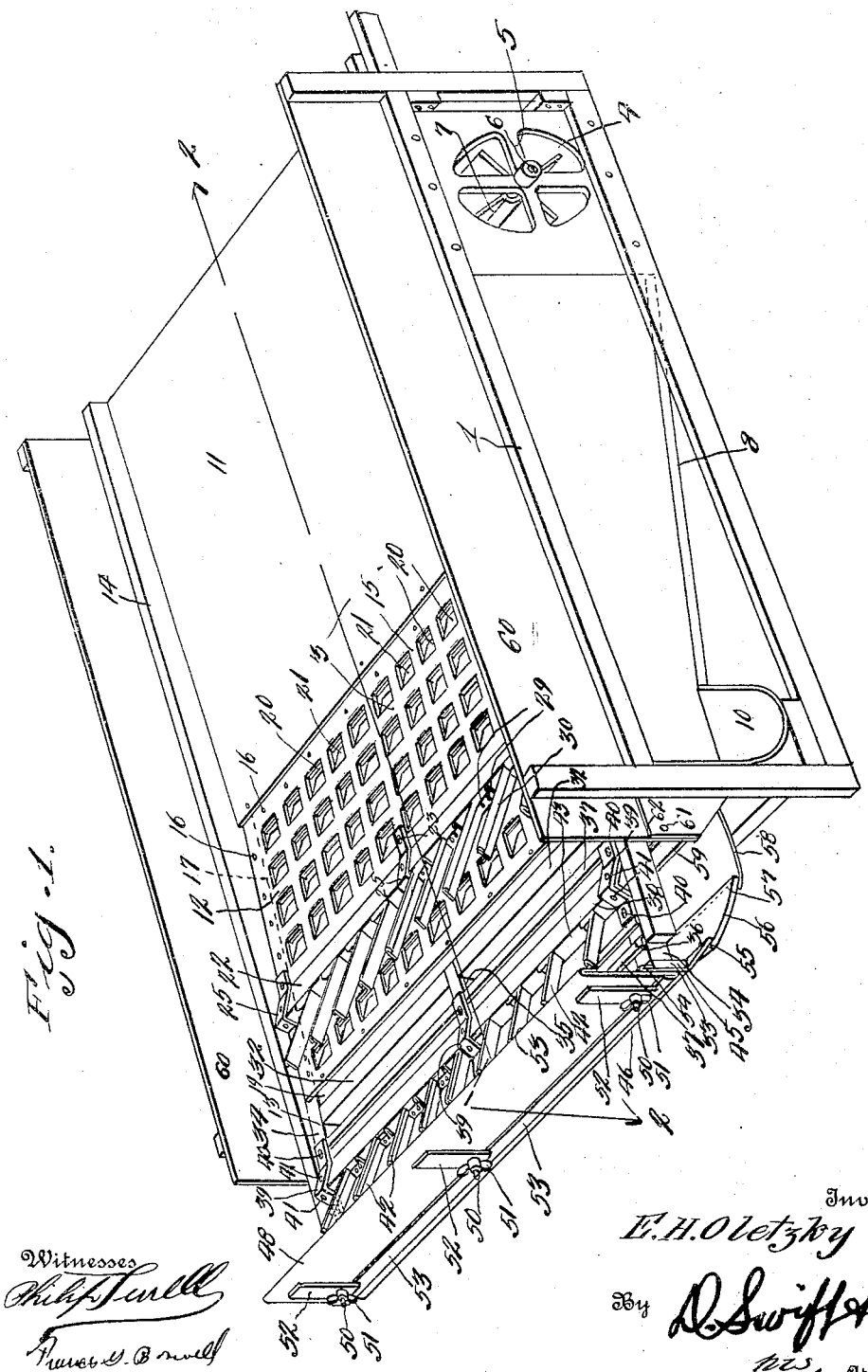

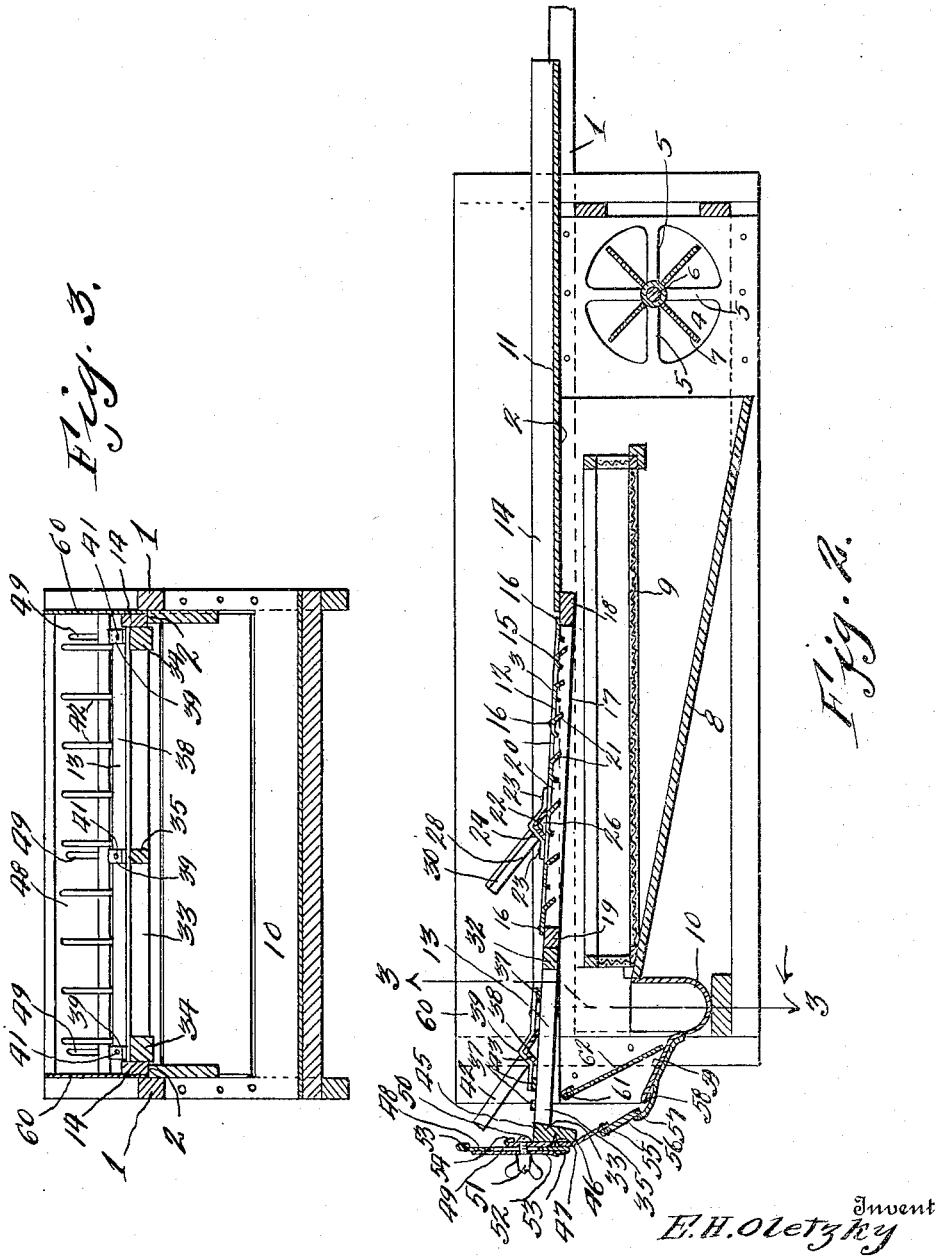

UNITED STATES PATENT OFFICE.

EDWARD H. OLETZKY, OF BIRMINGHAM, WASHINGTON.

CHAFF-SEPARATING MACHINE.

1,199,599. Specification of Letters Patent. Patented Sept. 26, 1916.

Aplication filed February 2, 1916. Serial No. 75,697.

*To all whom it may concern:*

Be it known that I, EDWARD H. OLETZKY, a citizen of the United States, residing at Birmingham, in the county of Snohomish, State of Washington, have invented a new and useful Chaff-Separating Machine; and I do hereby declare the following to be a full, clear, and exact description of the invention, such as will enable others skilled in the art to which it appertains to make and use the same.

This invention relates to an improved chaff separating machine, and an object of the invention is to provide a device of this nature having improved features of construction.

Another object of the invention is to provide a shaker member having openings at one end, and means extending transversely of the shaker over the openings for breaking the chaff from the grain (which passes or falls through the openings), so as to be blown beyond the shaker.

Another object of the invention is to provide means for removing the grain after being separated.

Another object of the invention is the provision of means, consisting of an adjustable extension member, for one end of the shaker acting as an abutment, to prevent the grain from being blown beyond the shaker.

Another object of the invention is the provision of means, consisting of an apron of any suitable material, upon the lower portion of the extension board or member, acting to save substantially all the grain, by deflecting it into a transverse chute, in which an auger carrier (not shown) is designed to be arranged for carrying the grain to the cylinder.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective illustrating the shaker member as applied to a part of a threshing machine, and illustrating the air blast means. Fig. 2 is a longitudinal sectional view of Fig. 1 on line 2—2. Fig. 3 is a sectional view on line 3—3 of Fig. 2. Fig. 4 is a view in perspective of the extension board and the apron carried thereby, and the adjustable extension grain abutment. Fig. 5 is a sectional view on line 5—5 of Fig. 4. Fig. 6 is an enlarged detail view of one of the plurality of angularly disposed members of the shaker, which members are used for breaking the chaff from the grain. Fig. 7 is an enlarged detail sectional view, illustrating how the member in Fig. 6 is mounted.

Referring more especially to the drawings, 1 designates a suitable frame having guides 2 for the shaker member or screen 3 or grain pan. At one end of the frame, directly opposite portions of the sides of the frame are provided with openings 4 having cross bars 5, in bearings of which the shaft 6, which is provided with a fan 7, is mounted. Immediately forward of the fan, the frame is provided with an inclined bottom 8, and mounted to move transversely in the guides of the frame above the bottom 8 is a shoe sieve 9, which is removable, in order to remove the grain, which does not enter the transverse chute 10, located forward of the bottom 8 and the shoe sieve, and in which chute a suitable screw carrier or conveyer (not shown) may be arranged. The shaker member may be reciprocated by any suitable means (not shown) and which shaker member comprises the grain pan end 11, the main or dominant screen or sieve plate 12, and the auxiliary extension sieve or screen 13. The opposite side rails 14 of the shaker member engage upon the guides 2 of the frame. These side rails 14 hold the grain and the like upon the shaker member. The dominant screen 12 consists of a plate 15, which is secured at 16 to the end strips 17, and the transverse strips 18 and 19. This screen plate is constructed with a plurality of rectangular screen openings 20, arranged in transverse and longitudinal rows. Integral with the forward edge of each opening 20 is a rearwardly and downwardly extending inclined deflecting tongue 21. When cutting the openings in the screen or sieve plate 15, the deflecting tongues 21 are formed.

A plate 22 is fastened at 23 adjacent the forward part of the screen or sieve plate, by means of the metal straps 24 and the screws at 23. It is to be noticed that the plate 22 is arched triangular in contour, and the straps 24 are correspondingly shaped, so as to arch over the plate 22, to which the straps 24 are riveted or otherwise secured, as shown at 25. It is to be observed that the hollow space 26 under the plate 22 is directly over or adjacent one of the transverse rows of openings 20, and by reason of the fact that the blast from the fan enters this space 26, and is deflected downwardly and forwardly by the inclined wall 27 of the plate 22, substantially a dead space 28 is caused to be formed forwardly of the wall 27 of the plate 22, for instance as at 28, thereby permitting the grain, which is separated and broken from the chaff, to more readily pass through the screen or sieve openings at this particular part thereof.

Secured at 29 to the wall 27 of the plate 22 are the arms or tines 30, which, owing to the wall 27 being inclined as shown, extend upwardly and forwardly, so that when the grain reaches the arms or tines, the chaff is broken or separated from the grain proper, the chaff being blown or carried beyond the plate 22 and the arms, while the grain proper passes through the screen or sieve openings. The tines or arms 30 are angular in contour, as shown in Fig. 6, and have their upper edge portions bent or turned over as shown in Fig. 6.

The auxiliary screen or sieve 13 comprises the transverse bars 32 and 33, which connect to the extended parts 34 of the end bars 17, and connecting the bars 32 and 33 is a central strip or bar 35.

Extending transversely of the shaker and connected at 36 to the extended parts 34 are metal strips 37 (which are in parallelism with the bars 32 and 33) and intervening said strips 37 is a plate 38, similar in construction to the plate 22, but auxiliary thereto, and which plate 38 is secured at its ends and its central portion by means of the metal straps 39 and the screws 40. It is to be noted that the straps 39 are secured at 41 to the ends of the plate 38. The plate 38 is angular in cross section, and serves the same purpose as that performed by the plate 22, in so far as deflecting the air blast. The plate or bar 38 carries arms or tines 42, which, owing to the wall 43 of the plate 38 being inclined, extend forwardly and upwardly, and serve the same purpose, as that performed by the arms or tines 30, namely, to separate the chaff from the grain proper, that is, of the grain that is not acted upon by the arms 30.

Connecting the extremities of the extended parts 34 of the end bars 17, and arranged transversely of the shaker, is a strip 45, to which an angular plate 46 is secured by screws 47. A grain extension abutment plate or member 48 is provided, which is supplied with slots 49. Extending through the plate 46 adjacent its upper edge are screws 50 which pass through the slots 49, and are provided with winged nuts 51, to draw the extension abutment tight against the plate 46 in vertical adjusted positions. This extension abutment plate constitutes means, to prevent grain from being blown or passing beyond the end of the sieve portion of the shaker, during the reciprocating movements thereof. Between the thumb or winged nuts and the extension abutment plates and on the screws 50, are cap plates 52 to cover the slots 49, to prevent grain from passing therethrough. The upper and lower edge portions of the extension abutment are bent over in opposite directions, thereby providing stiffening ribs 53. The upper edge portion of the plate 46 is bent over to supply a stiffening rib 54 for the plate 46. Fixed at 55 to the lower edge of the angular portion of the plate 46, is a heavy stiff piece of leather 56 or the like, the lower edge of which has in turn connected to it at 57, a heavy strip of linoleum, oil canvas or cloth or the like 58. One side wall of the chute 10 is provided with an extension lip 59, and owing to the angular part of the plate 46 and the heavy piece or strip of leather, the oil canvas or cloth or the like will tend to hug against the under surface of the extension lip, thereby preventing the loss of grain, that may not reach the chute.

Pivoted between the sides 60 of the frame 1 as at 61, is a tiltable plate 62, the lower edge of which rests on the upper face of the lip 59 near the edge portion of the chute.

It has been found through practical experience and demonstrations that, as the air blast (which is deflected upwardly in an inclined direction) from the fan passes upwardly through the auxiliary sieve portion adjacent the tines or arms 42, there is a suction tendency, between the pivoted plate 62 and the leather and oil canvas or cloth apron (which, though comparatively stiff, has sufficient tendency to flex toward and stay against the lip 59, as the shaker reciprocates) assisting materially to hold the apron against the lip 59, during the reciprocatory movement of the shaker. The grain that may reach the upper surface of the lip in the space between the apron and the plate 62, may be allowed to pass into the chute, by lifting the plate 62. As the shaker reciprocates, the grain is received upon the grain pan end of the shaker, and which grain in heavy and rapid or otherwise feeding thereof, is agitated toward and upon the sieve portion of the shaker, where it comes in contact with the forwardly and upwardly inclined tines or arms, thereby thoroughly breaking the chaff from the grain proper, the chaff being blown or passing on beyond, while the grain proper falls through the openings of the dominant and auxiliary portions of the sieve, into the shoe sieve 9 and the chute 10, where it is conveniently removed in any suitable manner.

The invention having been set forth, what is claimed as new and useful is:

1. In a chaff separator, a frame, a pneumatic chute therein, an agitating member thereabove having a grain receiving pan at one end and dominant and auxiliary sieves at the opposite end, chaff breaking means upon said sieves, a transverse chute adjacent the end of the pneumatic chute and having a forwardly extending lip, and an apron carried by and extending transversely of the agitator adapted to hug the under surface of the lip, thereby preventing the loss of grain.

2. In a chaff separator, a frame, a pneumatic passage therein, a grain agitator including chaff breaking means and a grain sieve, a transverse chute adjacent the end of the pneumatic passage and having a transverse but forwardly extending lip, an apron carried by and extending transversely of the agitator adapted to hug the under surface of the lip, thereby preventing the loss of grain, a transversely disposed pivoted plate between the sides of the frame and resting upon the lip, between which and the apron grain deposits.

3. In a chaff separator, a frame, a pneumatic passage therein, a grain agitator including chaff breaking means and a grain sieve, a transverse chute adjacent the end of the pneumatic passage and having a transverse but forwardly extending lip, an apron carried by and extending transversely of the agitator adapted to hug the under surface of the lip, thereby preventing the loss of grain, and an adjustable extension abutment plate forward of but secured adjacent to the sieve.

4. In a chaff separator, a frame, a pneumatic passage therein, a grain agitator including chaff breaking means and a grain sieve, a transverse chute adjacent the end of the pneumatic passage and having a transverse but forwardly extending lip, an apron carried by and extending transversely of the agitator adapted to hug the under surface of the lip, thereby preventing the loss of grain, a transversely disposed pivoted plate between the sides of the frame and resting upon the lip, between which and the apron grain deposits, and an adjustable extension abutment plate forward of but secured adjacent to the sieve.

In testimony whereof I have signed my name to this specification in the presence of two subscribing witnesses.

EDWARD H. OLETZKY.

Witnesses:
 HARRY J. WALLIS,
 THOS. A. LINDSY.

Copies of this patent may be obtained for five cents each, by addressing the "Commissioner of Patents, Washington, D. C."